Patented Jan. 4, 1944

2,338,655

UNITED STATES PATENT OFFICE 2,338,655

PROCESS FOR THE MANUFACTURE OF FURFURYL AMINES

James G. McNally and Joseph B. Dickey, Rochester, N. Y., and Arzy R. Gray, Kingsport, Tenn., assignors to Eastman Kodak Company, Rochester, N. Y., a corporation of New Jersey No Drawing. Application March 22, 1939, Serial No. 263,526

3 Claims. (Cl. 260—345)

This invention relates to a new process for the manufacture of furfuryl amines and in particular to the manufacture of α-furfuryl amine and tetrahydro-α-furfuryl amine.

Various furfuryl amine compounds are known in the prior art and several methods for their preparation have been suggested. Some of these methods involve the reaction of a furfuryl aldehyde with ammonia or the treatment of more or less complicated compounds such as hydrofuramide.

The furfuryl amines have a number of industrial uses as in the rubber industry and dye manufacture, for example. It is therefore apparent that the provision of new methods for the manufacture of such compounds is a highly desirable result.

We have found a new and improved method of manufacture for the furfuryl amines, which method employs certain different materials and otherwise distinguishes from prior art methods. We have found that high yields of the furfuryl amines may be obtained in a relatively simple and efficient manner.

This invention has for one object to provide a new method for the manufacture of furfuryl amines. Still another object is to provide a method for the manufacture of furfuryl amines which is applicable not only to the production of the unsaturated amine but also to the production of the tetrahydro form of furfuryl amine. Another object is to provide a process for the manufacture of furfuryl amines wherein a variety of catalyst may be employed. A still further object is to provide a process which may be conducted at relatively low temperatures and other simplified procedure employed. Other objects will appear hereinafter.

We have found that furfuryl amines such as α-furfuryl amine and tetrahydro-α-furfuryl amine may be prepared by our novel procedure which includes the steps of hydrogenating α-furfuraldoxime in the presence of one or more suitable catalysts, such as nickel, under pressures ranging from 40 or 50–160 atmospheres and a temperature ranging from between 40–50° C.—200° C. The hydrogenation may be carried out with or without a solvent such as lower aliphatic alcohol as for example, ethanol. While nickel has been mentioned as a suitable catalyst other catalysts may be used, such as copper chromite, copper, cobalt and in general, metals having an atomic weight greater than fifty. The nickel or other catalyst used may be supported on suitable material such as Kieselguhr or the catalyst may be employed in the colloidal or finely divided state. One suitable catalyst is the finely divided nickel obtained from the disintegration of nickel alloys such as nickel aluminum or nickel silicon alloys by various solvents as aqueous alkalis. The materials for the production of such type nickel catalysts are usually readily obtainable commercially and because of the relatively active commercially and because of the relatively active nickel obtained in this manner such a catalyst is satisfactory for use in our process.

The α-furfuraldoxime aforementioned may be obtained as follows: A reaction mixture comprising furfural, hydroxyl amine hydrochloride and an alkali hydroxide was prepared. The hydroxide liberates hydroxyl amine from the salt thereof. The liberated hydroxyl amine readily reacts with the furfural to produce the α-furfuraldoxime. The reaction progresses satisfactorily at room temperature. However, higher or lower temperatures may be employed if desired. Although the addition of the alkali is preferred, a certain amount of reaction takes place in either acid or alkaline solution. Consequently, we contemplate the aforementioned preparation under a variety of pH conditions ranging from a pH of 2 or 3 to 10, for example.

The α-furfuraldoxime may be isolated either entirely or in part from the reaction materials and treated by the additional steps to which our invention more particularly relates. The following examples illustrate in detail the different procedures which may be applied in carrying out our invention.

In accordance with Example I, approximately 111 gm. of α-furfuraldoxime obtained as described, was placed in a bomb with approximately 150 cc. of the solvent ethanol and hydrogenated in the presence of approximately 4 gm. of nickel catalyst (from a nickel alloy as described above). Temperatures of between 90°–100° C. were maintained and a pressure of between 50–140 atmospheres applied for the reaction period, which may comprise 1–10 hours. The product was fractionated and there was obtained a good yield of α-furfuryl amine boiling at 143–146°/752 mm.

In accordance with Example II, approximately 111 gm. of α-furfuraldoxime was placed in a bomb in the presence of approximately 150 cc. of the lower aliphatic alcohol solvent, ethanol. Approximately 4 gm. of nickel catalyst as described, was employed. After sufficient hydrogen had been added (under suitable conditions aforementioned) for the formation of α-furfuryl amine, the temperature was raised to approximately 150° C. The hydrogenation was continued until about the theoretical amount of hydrogen had been added for the formation of tetrahydro-α-furfuryl amine. The reaction mixture was then distilled and upon distillation yielded tetrahydro-α-furfuryl amine, b. p. 153–156°/750 mm., di-α-furfuryl amine and tetrahydro-di-α-furfuryl amine.

While we have described the use of nickel in the aforementioned examples, other hydrogenation catalysts may be employed in a similar manner. Although it has been indicated that an alcohol solvent is employed, the solvent may be omitted or replaced wholly or in part by other solvents, such as butanol, water, dioxane, ether, cyclohexane.

The resultant furfuryl amines produced by our process are of excellent quality and may be employed industrially for the purposes which furfuryl amines have heretofore been employed. Our furfuryl amines are particularly useful in the manufacture of dyes and dyeing and may be employed as couplers and intermediates or in the manufacture thereof, as described in the co-pending application 189,170, filed February 7, 1938.

It is apparent from the preceding that our invention may be modified in certain respects, as for example, in the employment of a variety of catalysts, pressures, temperatures and the like. Hence, we do not wish to be restricted in our invention, excepting insofar as is necessitated by the prior art and the spirit of the appended claims.

What we claim and desire to be secured by Letters Patent of the United States is:

1. A process for preparing a tetrahydrofurfuryl amine comprising hydrogenating furfuraldoxime, in the presence of a nickel catalyst under a pressure of 50 to 140 atmospheres at a temperature of from about 90° to about 100° C., until one mole of hydrogen for each mole of furfuraldoxime is absorbed, and then continuing the hydrogenation at 50 to 140 atmospheres at a temperature of about 150° C. until about two additional moles of hydrogen for each mole of furfuraldoxime are absorbed.

2. A process for preparing tetrahydrofurfuryl amine comprising hydrogenating furfuraldoxime in a lower aliphatic alcohol, in the presence of a nickel catalyst under a pressure of 50 to 140 atmospheres at a temperature of from about 90° to 100° C., until one mole of hydrogen for each mole of furfuraldoxime is absorbed, and then continuing the hydrogenation at 50 to 140 atmospheres at a temperature of about 150° C. until about two additional moles of hydrogen for each mole of furfuraldoxime are absorbed.

3. A process for preparing tetrahydrofurfuryl amine comprising hydrogenating furfuraldoxime in ethanol, in the presence of a nickel catalyst, under a pressure of 50 to 140 atmospheres at a temperature of from about 90° to 100° C., until one mole of hydrogen for each mole of furfuraldoxime is absorbed, and then continuing the hydrogenation at 50 to 140 atmospheres at a temperature of about 150° C. until about two additional moles of hydrogen for each mole of furfuraldoxime are absorbed.

JAMES G. McNALLY.
JOSEPH B. DICKEY.
ARZY R. GRAY.